US010803590B2

(12) United States Patent
Oh et al.

(10) Patent No.: US 10,803,590 B2
(45) Date of Patent: Oct. 13, 2020

(54) MULTIPLE-WAVELENGTH IMAGES ANALYSIS ELECTRO OPTICAL SYSTEM FOR DETECTION OF ACCIDENT SHIP AND SUBMERGED PERSON AND ANALYSIS METHOD THEREOF

(71) Applicant: KOREA INSTITUTE OF OCEAN SCIENCE & TECHNOLOGY, Busan (KR)

(72) Inventors: Sangwoo Oh, Sejong-si (KR); Tae-Sung Kim, Daejeon (KR); Won-Soo Kang, Sejong-si (KR); Moonjin Lee, Daejeon (KR); Tae-Byung Chun, Daejeon (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 0 days.

(21) Appl. No.: 16/470,531

(22) PCT Filed: May 16, 2018

(86) PCT No.: PCT/KR2018/005628
§ 371 (c)(1),
(2) Date: Jun. 17, 2019

(87) PCT Pub. No.: WO2019/132131
PCT Pub. Date: Jul. 4, 2019

(65) Prior Publication Data
US 2020/0143543 A1 May 7, 2020

(30) Foreign Application Priority Data
Dec. 28, 2017 (KR) .................. 10-2017-0182494

(51) Int. Cl.
*G06K 9/00* (2006.01)
*G06T 7/11* (2017.01)
(Continued)

(52) U.S. Cl.
CPC ............... *G06T 7/11* (2017.01); *G06T 7/143* (2017.01); *H04N 5/33* (2013.01); *G06T 2207/10048* (2013.01)

(58) Field of Classification Search
CPC ... G06T 7/11; G06T 7/43; G06T 2207/10048; H04N 5/33
See application file for complete search history.

(56) References Cited

U.S. PATENT DOCUMENTS 8,300,108 B2  10/2012  Van Hoorebeke et al.
9,615,006 B2 *  4/2017  Terre ...................... H04N 5/332
(Continued)

FOREIGN PATENT DOCUMENTS

KR  10-2011-0089892 A  8/2011
KR  10-2013-0121202 A  11/2013
(Continued)

OTHER PUBLICATIONS

Notice of Allowance for Korean Patent Application No. 10-2017-0182494, dated Apr. 5, 2018, including Verified English translation, 5 pages.
(Continued)

*Primary Examiner* — Gregory M Desire
(74) *Attorney, Agent, or Firm* — Lewis Roca Rothgerber Christie LLP

(57) ABSTRACT

A multiple-wavelength image analysis electro-optical system for detecting a disabled ship and persons overboard of the present invention is a multiple-wavelength image analysis electro-optical system for detecting a disabled ship and persons overboard configured to have an input part 10
(Continued)

(a)

(b)

(c)

provided with an ultra-low light camera 3, a short-wavelength infrared image sensor 5, a medium-wavelength infrared image sensor 7, and a long-wavelength infrared image sensor 9; a signal processing part 20 for receiving and processing data of the input part 10; a display part 30 for receiving and displaying data of the signal processing part 20; a storage part 40 for storing data of the signal processing part 20 and the display part 30; and a control part 90 provided with a camera control board 50 and a drive control board 60 for controlling the input part 10, signal processing part 20, the display part 30 and the storage part 40.

7 Claims, 10 Drawing Sheets

(51) Int. Cl.
*G06T 7/143* (2017.01)
*H04N 5/33* (2006.01)

(56) References Cited

U.S. PATENT DOCUMENTS

| | | | | |
|---|---|---|---|---|
| 9,944,366 B2* | 4/2018 | Tang | | B63C 9/01 |
| 10,055,648 B1* | 8/2018 | Grigsby | | G06K 9/00771 |
| 10,089,547 B2* | 10/2018 | Shemesh | | G01J 3/32 |
| 10,181,249 B2* | 1/2019 | Snyder | | G08B 13/1961 |
| 2011/0164108 A1* | 7/2011 | Bates | | H04N 5/23238 |
| | | | | 348/36 |
| 2015/0341532 A1* | 11/2015 | Terre | | H04N 7/183 |
| | | | | 348/376 |
| 2016/0214534 A1* | 7/2016 | Richards | | H04N 13/204 |
| 2016/0266246 A1* | 9/2016 | Hjelmstad | | G01S 15/86 |

FOREIGN PATENT DOCUMENTS

| | | |
|---|---|---|
| KR | 10-2014-0043976 A | 4/2014 |
| KR | 10-2015-0011098 A | 1/2015 |
| KR | 10-2017-0087836 A | 7/2017 |

OTHER PUBLICATIONS

Office Action for Korean Patent Application No. 10-2017-0182494, dated Jan. 12, 2018, including Verified English translation, 10 pages.
Verified English translation of Allowed Claims for Korean Patent Application No. 10-2017-0182494, dated Apr. 5, 2018, 7 pages.

* cited by examiner

[FIG. 1]
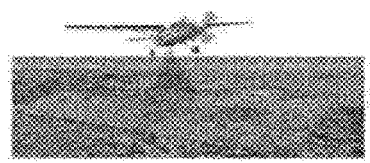 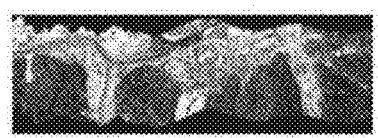 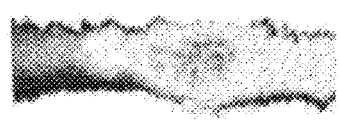
(a)            (b)            (c)

[FIG. 2]
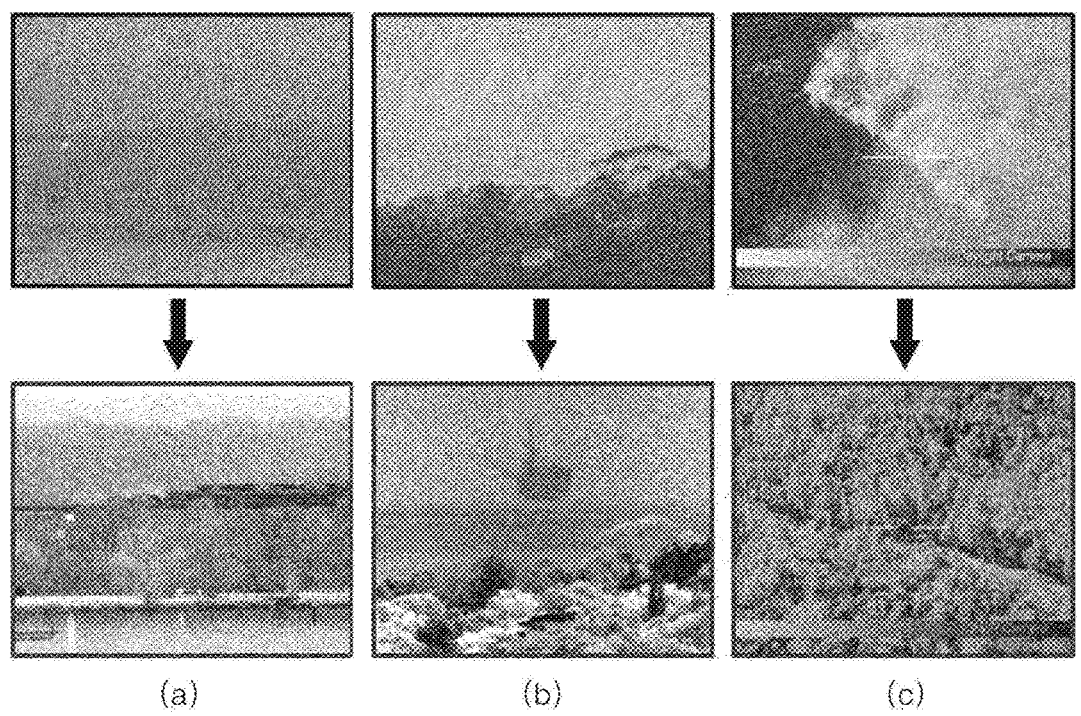
(a) (b) (c)

[FIG. 3]
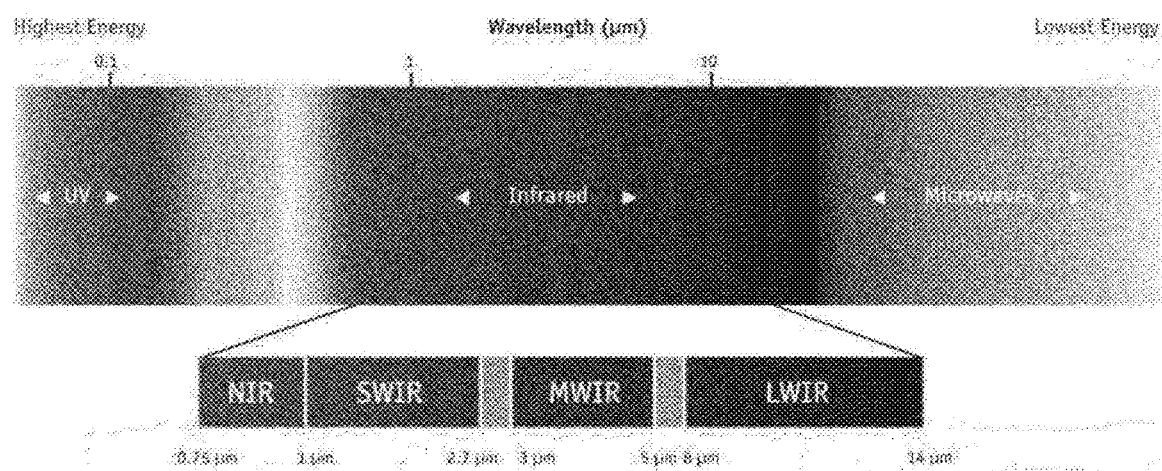

[FIG. 4]
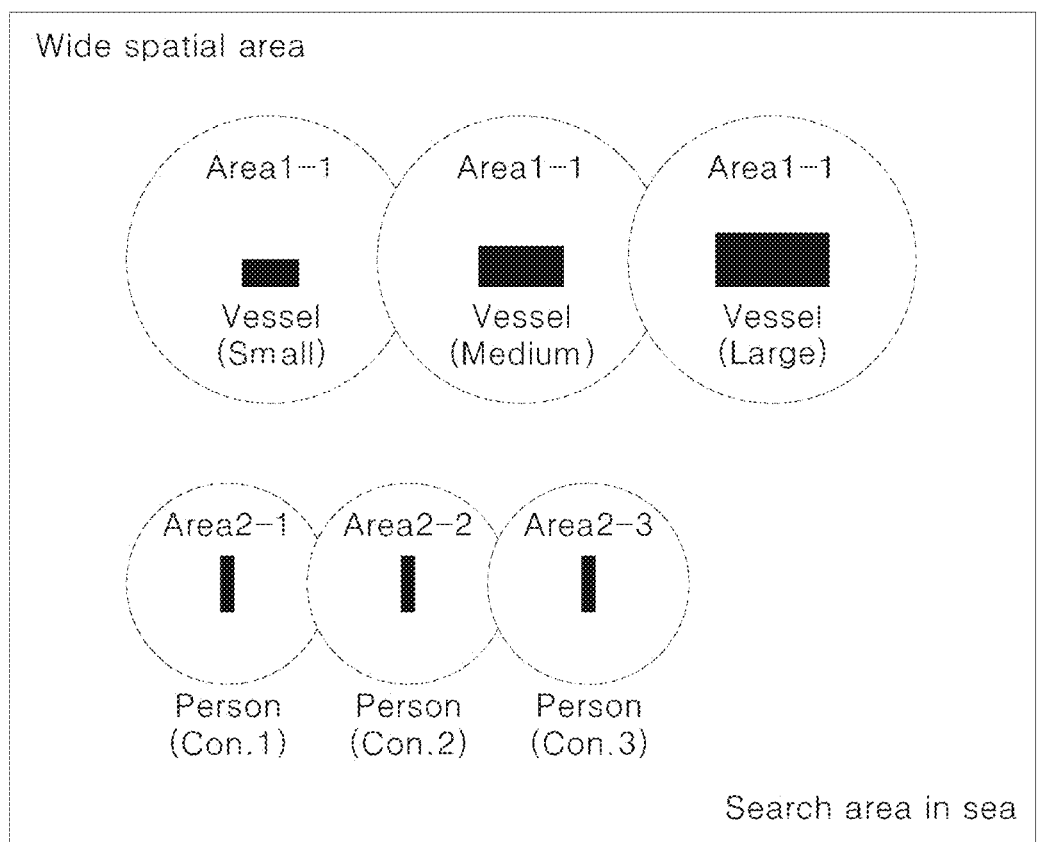

[FIG. 6]
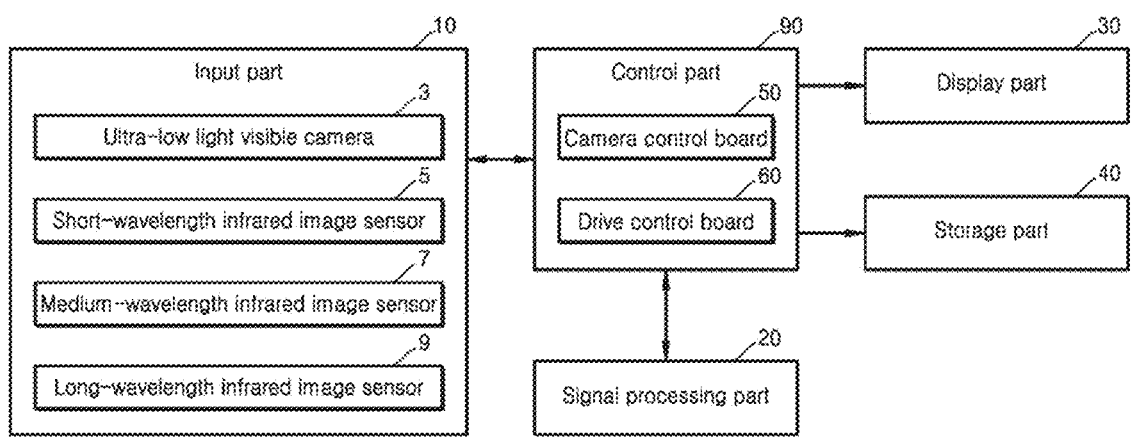

[FIG. 7]
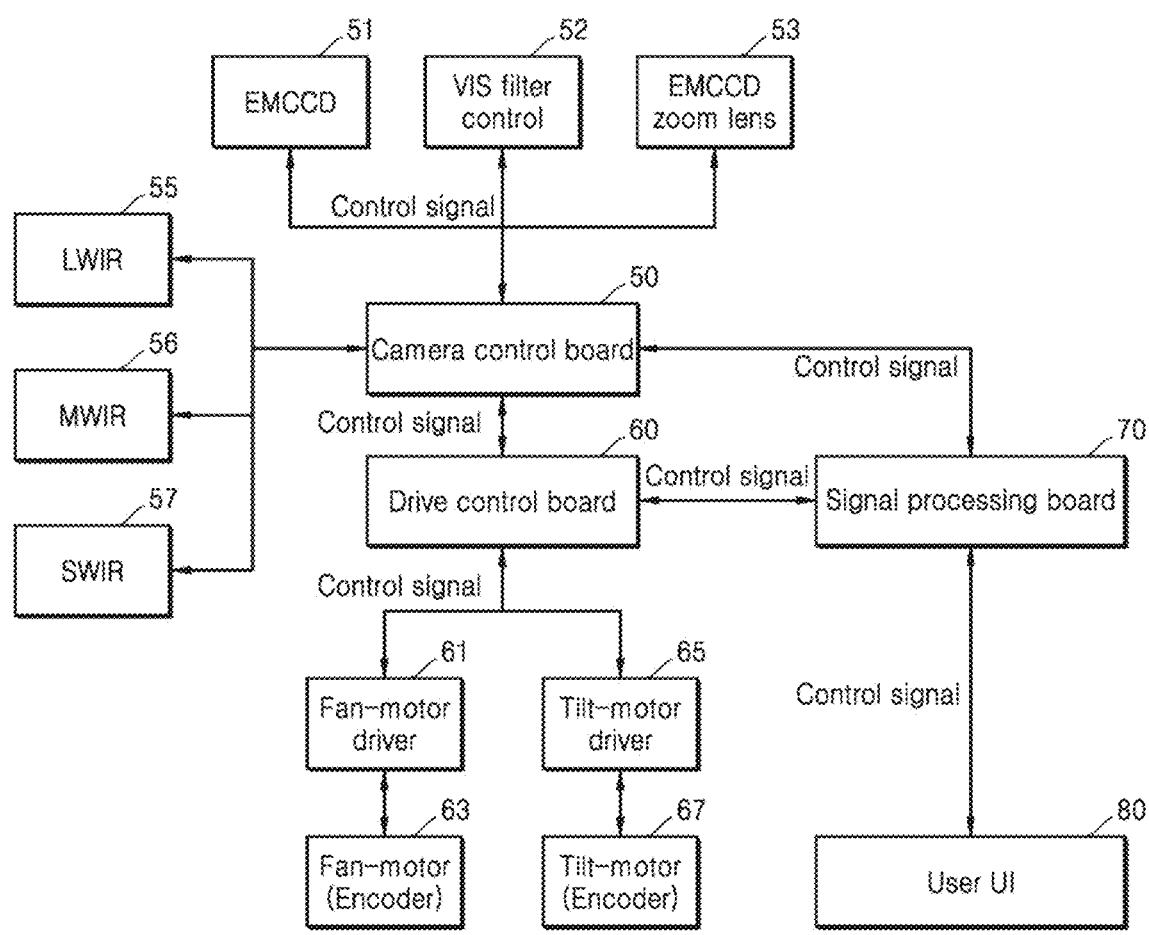

[FIG. 8]
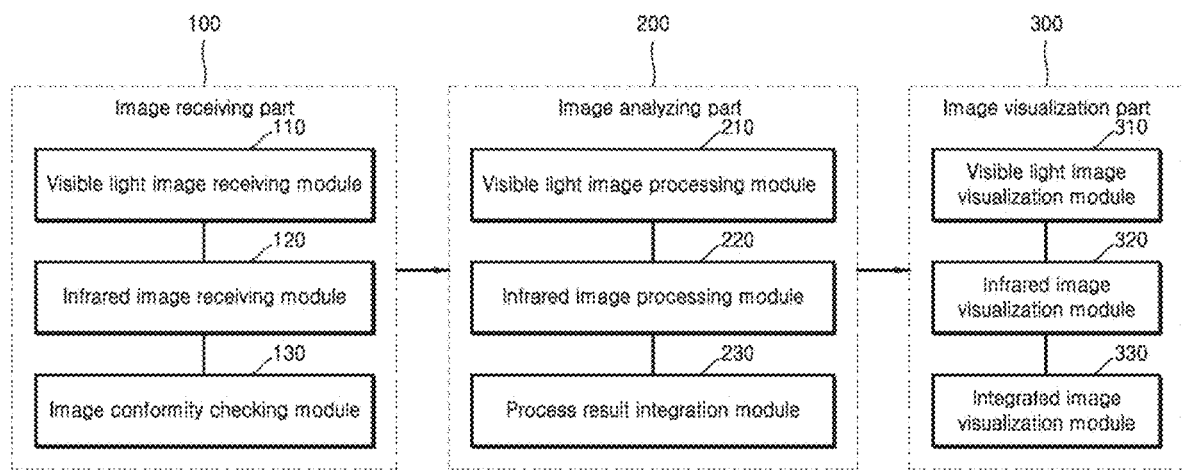

[FIG. 9]
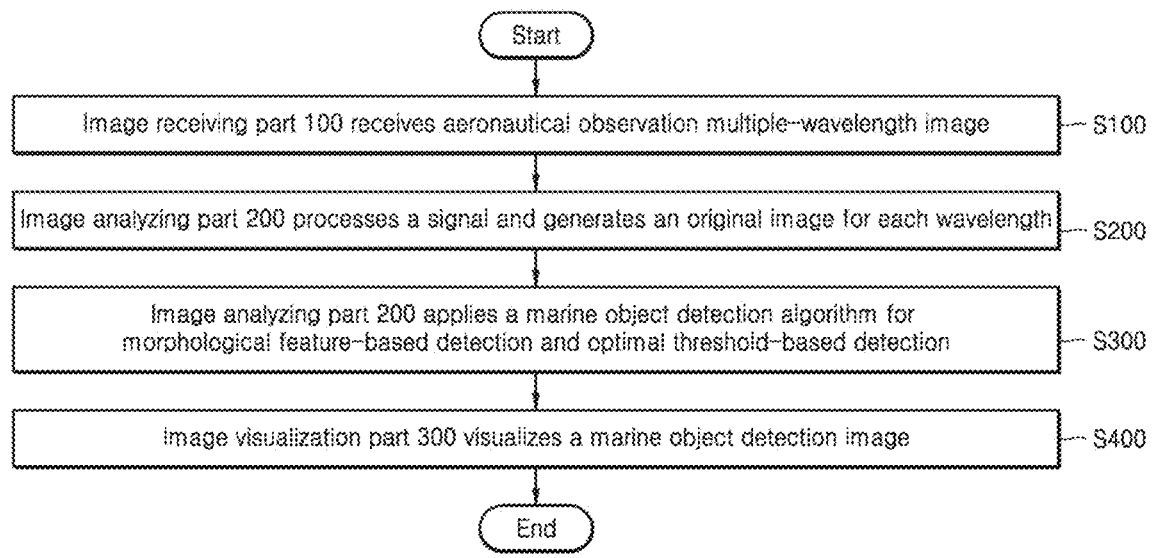

[FIG. 10]
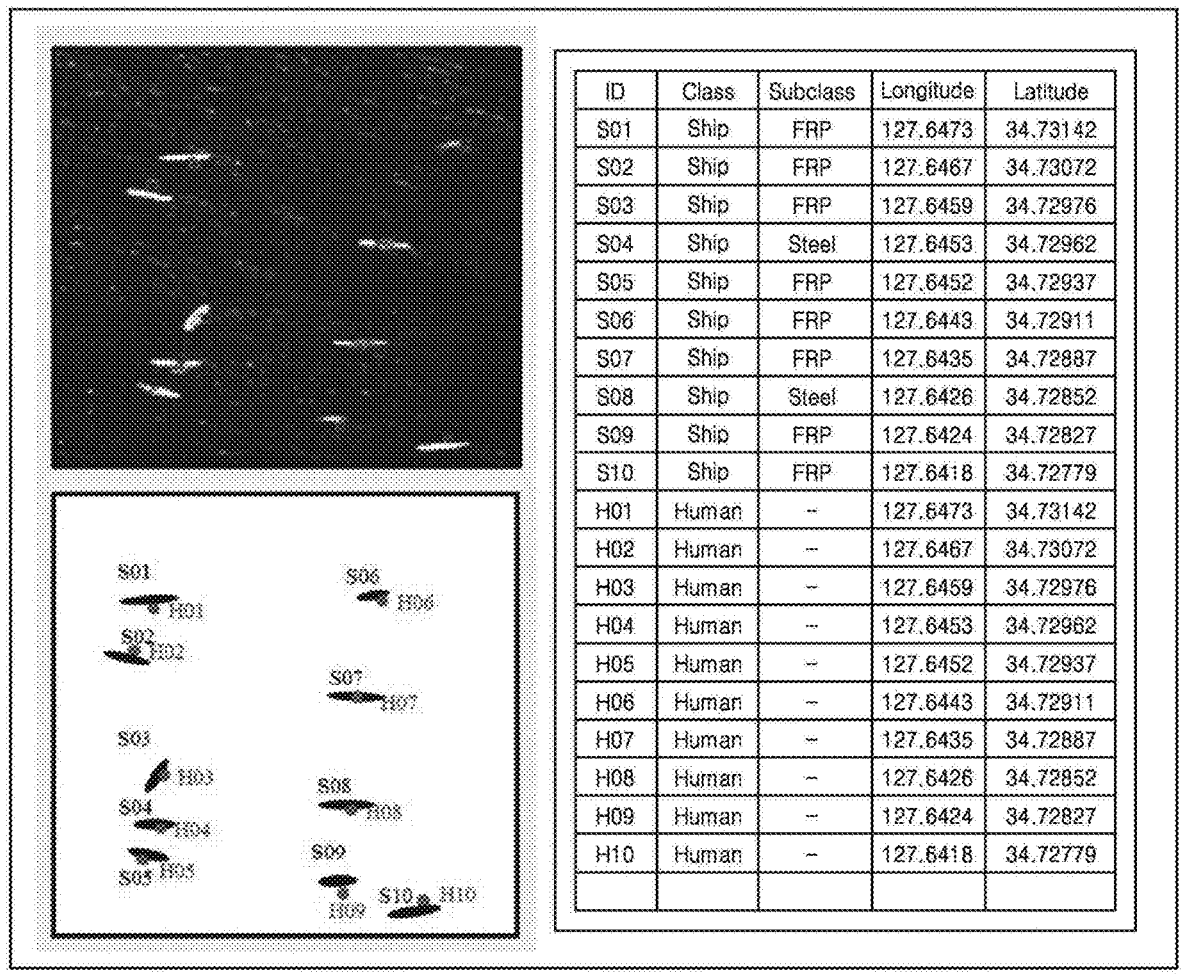

MULTIPLE-WAVELENGTH IMAGES ANALYSIS ELECTRO OPTICAL SYSTEM FOR DETECTION OF ACCIDENT SHIP AND SUBMERGED PERSON AND ANALYSIS METHOD THEREOF

CROSS-REFERENCE TO RELATED APPLICATION(S)

This application is a National Phase Patent Application of International Patent Application Number PCT/KR2018/005628, filed on May 16, 2018, which claims priority of Korean Patent Application No. 10-2017-0182494, filed Dec. 28, 2017. The entire contents of both of which are incorporated herein by reference.

TECHNICAL FIELD

The present invention relates to a multiple-wavelength image analysis electro-optical system and an analysis method thereof, particularly for improving the probability of detecting disabled vessels and persons overboard at sea by using images of multiple-wavelength bands. More specifically, the present invention relates to a multiple-wavelength image analysis based detection system apparatus and a method thereof for visualizing search targets using image information of selective wavelength bands depending on each marine environmental condition or physical condition of a search target.

BACKGROUND ART

Recently, there have been an increasing number of national disasters such as the sinking of the Cheonan-ham and the sinking of the Seweol-ho that occurred in Korea. Therefore, there is a need to develop technologies that can minimize the damage caused by marine accidents and counteract marine accidents at national level.

The search for missing persons and disabled vessels carried out by domestic search organizations (Marine Security and Safety Division, the Navy) is conducted using a search platform (vessel, airplane) with visual search/visible light camera (daytime) and an infrared camera (nighttime).

However, these methods have technical limitations in that they are inefficient in various marine environmental constraints (fog, fine dust, rain, low light).

That is, the electro-optic equipment used in marine accident searches in Korea is limited to color images in the daytime and to the function of obtaining thermal images in the nighttime. Therefore, in the case of marine environmental conditions such as fog, fine dust, rain and the like, where detection is difficult using the above-mentioned functions, there is a disadvantage in that the detection probability is low because the utilization of the equipment is limited.

In addition, a visible light camera, as a daytime image camera, can be developed by a domestic company, but most infrared cameras, as night vision cameras, are being integrally developed by having products introduced from abroad.

In the case of advanced overseas organizations (US Coast Guard, US Navy, etc.), electro-optical system using spectral image analysis, which is a specialized method with high detection degree according to search target and search environment conditions, is utilized as search support equipment.

When such electro-optical system equipment is applied, it is possible to obtain optimized search images, enabling quick search and rescue compared to existing search equipment (radar, daytime camera, nighttime camera, etc.).

Although it is also possible for the Navy to perform surveillance and reconnaissance missions during daytime and nighttime in Korea since electro-optical surveillance equipment (EOTS/IRS) is mounted on a next frigate (FFX class), this is also a detection method considering only day and night conditions (light), and because the marine environmental conditions and the characteristics of the search target cannot be considered, only limited application is possible.

In addition, the US infrared band electro-optical sensor is an item target to import and export control regulations, and other than exceptions for public or research purposes, imports are limited for private development. Therefore, the international competitiveness of domestic companies in the market of developing electro-optical systems using such electro-optical sensors is currently very low.

Image analysis methods using multiple-wavelength images are being gradually proposed all over the world in the field of remote detection technology using electro-optical images. Although approaches to such methods are being actively attempted in the fields of defense surveillance, geographic information and environmental surveillance, limited research is being carried out in the field of marine search platform (aircraft, vessel) based image analysis.

Much of marine accidents or casualties in the ocean occur mainly in poor marine environments, such as when it is raining or foggy. In order to search for a vessel in distress or persons overboard caused by a marine accident, a search platform such as an aircraft or a vessel is mobilized. As the size of the search target is smaller, an electro-optical sensor having a relatively higher detection resolution is mainly used rather than an active sensor such as a radar having electromagnetic waves as a parameter.

However, the currently used electro-optical sensors have a limitation in utilizing in dark conditions without natural light or in misty or rainy conditions. Also, when the size and color of the target to be detected do not differ from the surrounding environment, there is a disadvantage in that the degree of distinction becomes lower.

In order to overcome such problems, it is necessary to develop a technology to detect and visualize the target to be detected at sea by selecting a wavelength band in which the optimal degree of distinction is shown in consideration of search environment conditions and spectroscopic characteristics of the target to be searched.

U.S. Pat. No. 8,300,108 relates to a multi-channel imaging apparatus, which uses a single focal plane array (FPA) to provide an improved object identification method and a high-resolution infrared image including range and polarization information for identification, broadband fan color light intensity level, and multi-spectrum contents. In addition, certain embodiments increase the size of the filters used to filter image contents and reduce complexity, thereby reducing manufacturing and production costs. Further, a subpixel parallax is used to generate a high resolution image, to provide a range estimate of the target, and to distinguish moving objects from background disturbances. However, in order for a conventional technology such as what is disclosed in U.S. Pat. No. 8,300,108 to be utilized as a multiple-wavelength image analysis electro-optical system for detecting a disabled vessel and persons overboard and an analysis method thereof, the following two conditions must be overcome.

First, there is a marine environmental condition in which detection is possible. Unlike conventional electro-optical sensors, wherein they are used only in daytime environments with good weather conditions and sufficient light intensity, it should be possible to operate even in nighttime environments with limited light intensity as well as in bad weather conditions with fog, sea fog or conditions where smoke is caused by fire and such, by using multiple-wavelength band images acquired through ultra-low light visible broadband image sensors and additional infrared band sensors. This can greatly enhance the operability in marine environmental conditions where marine accidents mainly occur, and can improve the probability of rescuing in vessel accidents or casualty accidents compared to existing electro-optical sensors.

Second, there is the degree of distinction of the detected object. In the case of an electro-optical sensor based on a conventional visible broadband, since the detection is performed using only the difference between the observed values of the target object (vessel, persons overboard) and the background (sea water) at the time of the detecting at sea, if the absolute value characteristics within the observed band range are similar due to the marine state or color of the target material, detection is not performed or false detection is made. Particularly, as mentioned above, in nighttime and some bad weather environments where marine accidents mainly occur, it is impossible to acquire most observation values in the images, or even if observations are made, the differences of the image observation values are not clear, so the probability of detection rate is significantly lowered. Therefore, by using a multiple-wavelength image including observation values of each selected wavelength band using an ultra-low light intensity sensor and filter for converting and amplifying the limited optical signal, and additional three infrared bands (long-wavelength, medium-wavelength and short-wavelength infrared), optimal detection of a target object should be possible in a limited marine accident environmental condition. Further, since it is possible to utilize improved optical contrast characteristics and additional thermal contrast characteristics through multiple-wavelength image acquisition, a more accurate and stable detection and visualization of marine objects compared to existing sensors should be possible in all day and night environments.

DETAILED DESCRIPTION OF THE INVENTION

Technical Problem

The present invention is directed to providing a multiple-wavelength image analysis electro-optical system for detecting a disabled vessel and persons overboard and an analysis method thereof, that can integrate multiple-wavelength images acquired through a multiple-wavelength image sensor under various marine environmental conditions such as fog, fine dust, smoke and the like, selectively analyze sensor images for each condition including search target size, type and state, and improve the probability of detection of a disabled vessel and persons overboard.

Technical Solution

In order to accomplish the above object, a multiple-wavelength image analysis electro-optical system for detecting a disabled vessel and persons overboard of the present invention may be configured to have, an input part provided with an ultra-low light camera, a short-wavelength infrared image sensor, a medium-wavelength infrared image sensor, and a long-wavelength infrared image sensor; a signal processing part for receiving and processing data of the input part; a display part for receiving and displaying data of the signal processing part; a storage part for storing data of the signal processing part and the display part; and a control part provided with a camera control board and a drive control board for controlling the input part, the signal processing part, the display part and the storage part.

Here, the camera control board may include an EMCCD module, a VIS filter control module, and an EMCCD zoom lens module.

Here, the camera control board may include an LWIR module, an MWIR module, and an SWIR module.

Here, the drive control board may include a fan-motor driver and a fan-motor encoder.

Here, the drive control board may include a tilt-motor driver and a tilt-motor encoder.

Here, the camera control board and the drive control board may receive a control signal from a signal processing board.

Here, the signal processing board may receive a control signal from a user UI.

Here, the input part may be provided with an image receiving part, and the image receiving part may further include a visible light image receiving module, an infrared image receiving module, and an image conformity checking module.

Here, the signal processing unit may be provided with an image analyzing part, and the image analyzing part may further include a multispectral library module, a multispectral mixture analysis module, and a process result integration module.

Here, the display part may include an image visualization part, and the image visualization part may further include a multiple-wavelength image visualization module, an infrared image visualization module, and an integrated image visualization module.

In order to accomplish the other above object, an analysis method of a multiple-wavelength image analysis electro-optical system for detecting a disabled vessel and persons overboard of the present invention may include, (a) receiving an observed aeronautical multiple-wavelength image via an image receiving part; (b) processing a signal and generating an original image for each wavelength via an image analyzing part; and (c) applying a marine object detection algorithm for morphological feature-based detection and optimal threshold-based detection via the image analyzing part; and (d) visualizing a marine object detection image via an image visualization part 300.

Here, the above-mentioned step (a) may further include, (a-1) using a short-wave infrared sensor for a wavelength of 1 to 2.5 µm, which is longer than particles of fog, fine dust, smoke and etc.; and (a-2) using a long-wave infrared (LWIR) sensor for a wavelength of 8 to 14 µm, which is longer than the short-wave infrared (SWIR) sensor, when in a low light environment.

Here, the above-mentioned step (c) may further include (c-1) expressing what is observed from each pixel into a feature vector for image segmentation and assuming an appropriate probability model relative thereto, and performing segmentation by using parameters estimated by a statistical method for determining the probability model, or using a cluster algorithm based on a degree of similarity between each feature vector, via the marine object detection algorithm for morphological feature-based detection based on the multiple-wavelength image.

Here, the above-mentioned step (c) may further include (c-1) calculating a maximum likelihood for an unknown parameter in an incomplete data in one case or finding a maximum value of a posterior probability distribution, via the marine object detection algorithm for morphological feature-based detection based on the multiple-wavelength image.

Here, the above-mentioned step (c) may further include (c-2) the marine object detection algorithm for optimal threshold-based detection based on the multiple-wavelength image may use an optimized image segmentation technique for setting a threshold through a new histogram of an image by mixing a Gaussian formula formed around all level values of the image with an original histogram of the image.

Here, the above-mentioned step (d) may further include (d-1) selecting a specific band (e.g. RGB) to display and store an inputted aeronautical visible light image in an image form in a visible light image visualization module; and (d-2) displaying and storing an aeronautical infrared image in an image form in an infrared image visualization module.

Here, the above-mentioned step (d) may further include (d-3) distinguishing the detected disabled vessel and persons overboard to visualize a location of a detected body in an integrated image form and displaying and storing the same, via the integrated image visualization module.

Here, the above-mentioned step (d) may further include (d-4) displaying an aeronautical observation multiple-wavelength image that undergone a preprocessing process in the image receiving part and a detected body detected within a corresponding area in an image form by time together with detailed information displayed in text form, via the integrated image visualization module.

Here, the above-mentioned step (d) may further include (d-4) dividing the detection result according to classification to display and store in a tabular form together with detailed information such as type, material, latitude and longitude, via the integrated image visualization module.

In order to accomplish yet another object, a computer readable recording medium storing a program for implementing an analysis method of a multiple-wavelength image analysis electro-optical system for detecting a disabled vessel and persons overboard may be provided.

Specific details of other embodiments are included in the "Modes for carrying out the Invention" and "Drawing" attached.

The advantages and/or features of the present invention and the manner of achieving them will be apparent by reference to various embodiments described in detail below with reference to the accompanying drawings.

However, the present invention is not limited to the configurations of the embodiments described below, but may be embodied in various other forms, and each embodiment disclosed in this specification is intended to be illustrative only. It will be understood by those of ordinary skill in the art that various changes in form and details may be made therein without departing from the spirit and scope of the invention as defined by the appended claims.

Advantageous Effects

According to the present invention, by using a multiple-wavelength band image acquired through an ultra-low light visible-light band image sensor and an additional infrared band sensor, it is possible to operate in a nighttime environment with limited amount of light as well as in conditions of bad weather such as fog or sea fog or where smoke occurs due to fire and etc.

In addition, through this, it is possible to greatly enhance the operability in marine environmental conditions where marine accidents mainly occur, and thus it is possible to effectively improve the probability of rescuing in vessel accidents or casualty accidents compared to existing electro-optical sensors.

Further, other than observation values for each selected wavelength band and a visible light band using an ultra-low light sensor and filter for converting and amplifying limited light signals, by using a multiple-wavelength image including three additional infrared band observation values long-wavelength, medium wavelength, short-wavelength infrared), optimal object detection in a limited marine accident environment condition is possible.

In addition, since it is possible to enhance utilization of optical contrast characteristics and additional thermal contrast characteristics through the acquisition of multiple-wavelength images, it is possible to detect and visualize marine objects more accurately and stably than existing sensors in all day and night environment conditions.

DESCRIPTION OF THE DRAWINGS

FIG. 1(a) to FIG. 1(c) show schematic views of, acquisition of an aeronautical multiple-wavelength image, image of an area subject to monitoring in an aeronautical multiple-wavelength image data, and a method of analyzing an image in an aeronautical multiple-wavelength image.

FIG. 2 is a photograph illustrating images taken in a detection condition of fog (a), fine dust (b), smoke (c), by selecting sensors having high transmittance for each environmental condition.

FIG. 3 is a graph illustrating SWIR, MWIR, and LWIR regions of multiple-wavelengths.

FIG. 4 is a schematic diagram in which a search area of the sea is set according to the size (small, medium, large) of the vessel and the submerged state of the missing person (state 1, state 2, state 3).

FIG. 6 is a block diagram illustrating a multiple-wavelength image analysis electro-optical system for detecting a disabled vessel and persons overboard according to the present invention.

FIG. 7 is a circuit diagram illustrating the connection of circuits of a multiple-wavelength image analysis electro-optical system for detecting a disabled vessel and persons overboard according to the present invention shown in FIG. 5.

FIG. 8 is a block diagram illustrating a signal processing unit of a multiple-wavelength image analysis electro-optical system for detecting a disabled vessel and persons overboard according to the present invention shown in FIG. 5.

FIG. 9 is a flowchart illustrating an analysis method of a multiple-wavelength image analysis electro-optical system for detecting a disabled vessel and persons overboard according to the present invention shown in FIG. 5.

FIG. 10 is a screen of an exemplary embodiment of the detection result of a disabled vessel and persons overboard displayed via an image visualization part 300 of a multiple-wavelength image analysis electro-optical system for detecting a disabled vessel and persons overboard according to the present invention.

BEST MODE FOR CARRYING OUT THE INVENTION

Figure 5:
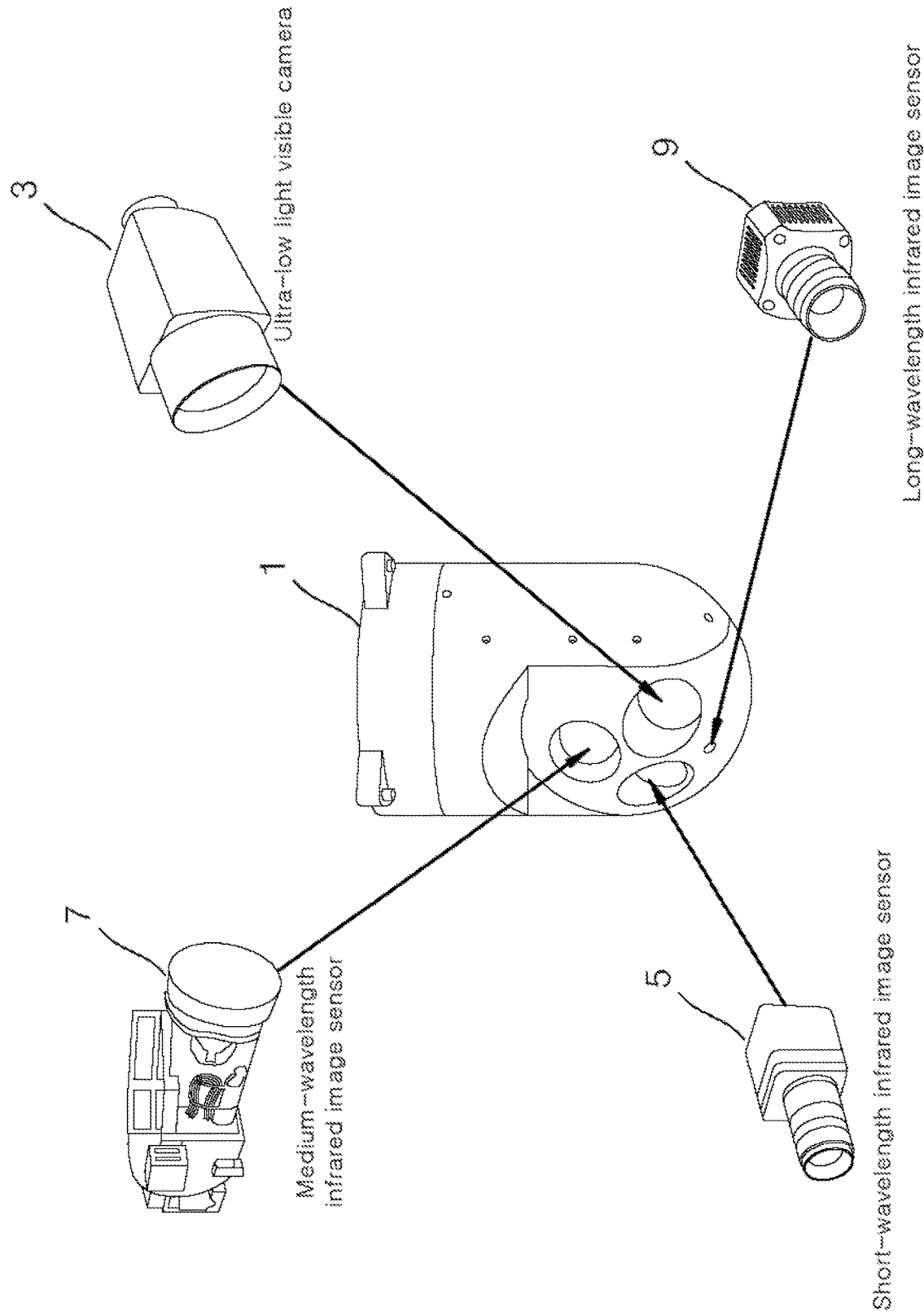
FIG. 5 is a photograph of a multiple-wavelength image analysis electro-optical system for detecting a disabled vessel and persons overboard according to the present invention.

Hereinafter, preferred embodiments of the present invention will be described in detail with reference to the accompanying drawings.

Before describing the present invention in detail, terms and words used herein should not be construed as being unconditionally limited in a conventional or dictionary sense, and the inventor of the present invention can define and use concepts of various terms appropriately as needed in order to explain the present invention in the best way.

Furthermore, it should be understood that these terms and words are to be construed in light of the meanings and concepts consistent with the technical idea of the present invention.

In other words, the terminology used herein is for the purpose of describing preferred embodiments of the present invention, and is not intended to specifically limit the content of the present invention.

It should be understood that these terms are defined terms in view of the various possibilities of the present invention.

Further, in this specification, the singular forms "a", "an," and "the" include plural referents unless the context clearly dictates otherwise.

Also, it should be understood that the present invention can include a singular meaning even if it is similarly expressed in plural.

Where a component is referred to as "comprising" another component throughout this specification, unless specified otherwise, this means the component does not exclude any other element but may further include any other element.

Further, when it is stated that an element is "inside or connected to another element", this element may be directly connected to another element or may be installed in contact with it.

In addition, it may be installed spaced apart with a predetermined distance, and in the case where a component is installed to be spaced apart with a predetermined distance, a third component or means for fixing or connecting the component to another component may be present.

Meanwhile, it should be noted that the description of the third component or means may be omitted.

On the other hand, it should be understood that there is no third component or means when an element is described as being "directly coupled" or "directly connected" to another element.

Likewise, other expressions that describe the relationship between the components, such as "between" and "right between ~", or "neighboring to" and "directly adjacent to" and such should be understood in the same spirit.

Further, in this specification, when terms such as "one surface", "other surface", "one side", "other side", "first", "second" and such are used, it is to clearly distinguish one component from another.

It should be understood, however that the meaning of the component is not limited by such term.

It is also to be understood that terms related to positions such as "top", "bottom", "left", "right" in this specification are used to indicate relative positions in the drawings for the respective components.

Further, unless an absolute position is specified for these positions, it should not be understood that these position-related terms refer to absolute positions.

Furthermore, in the specification of the present invention, the terms "part", "unit", "module", "device" and the like mean a unit capable of handling one or more functions or operations.

These may be implemented as hardware or software, or a combination of hardware and software.

It is to be understood that the size, position, coupling relationships and such, of each component constituting the present invention in the accompanying drawings, may be partially exaggerated or reduced or omitted to be able to sufficiently clearly convey the scope of the invention or for convenience of describing, and therefore the proportion or scale thereof may not be rigorous.

Also, in the following description of the present invention, a detailed description of a configuration that is considered to unnecessarily obscure the gist of the present invention, for example, a known technology including the prior art, may be omitted.

FIG. 1(a) to FIG. 1(c) show schematic views of, acquisition of an aeronautical multiple-wavelength image, image of an area subject to monitoring in an aeronautical multiple-wavelength image data, and a method of analyzing an image in an aeronautical multiple-wavelength image.

FIG. 2 is a photograph illustrating images taken in a detection condition of fog (a), fine dust (b), smoke (c), by selecting sensors having high transmittance for each environmental condition.

FIG. 3 is a graph illustrating SWIR, MWIR, and LWIR regions of multiple-wavelengths.

FIG. 4 is a schematic diagram in which a search area of the sea is set according to the size (small, medium, large) of the vessel and the submerged state of the missing person (state 1, state 2, state 3).

FIG. 5 is a photograph of a multiple-wavelength image analysis electro-optical system for detecting a disabled vessel and persons overboard according to the present invention.

FIG. 6 is a block diagram illustrating a multiple-wavelength image analysis electro-optical system for detecting a disabled vessel and persons overboard according to the present invention.

FIG. 7 is a circuit diagram illustrating the connection of circuits of a multiple-wavelength image analysis electro-optical system for detecting a disabled vessel and persons overboard according to the present invention shown in FIG. 5.

FIG. 8 is a block diagram illustrating a signal processing unit of a multiple-wavelength image analysis electro-optical system for detecting a disabled vessel and persons overboard according to the present invention shown in FIG. 5.

FIG. 9 is a flowchart illustrating an analysis method of a multiple-wavelength image analysis electro-optical system for detecting a disabled vessel and persons overboard according to the present invention shown in FIG. 5.

FIG. 10 is a screen of an exemplary embodiment of the detection result of a disabled vessel and persons overboard displayed via an image visualization part 300 of a multiple-wavelength image analysis electro-optical system for detecting a disabled vessel and persons overboard according to the present invention.

A multiple-wavelength image analysis electro-optical system for detecting a disabled ship and persons overboard of the present invention is a multiple-wavelength image analysis electro-optical system for detecting a disabled ship and persons overboard configured to have an input part 10 provided with an ultra-low light camera 3, a short-wavelength infrared image sensor 5, a medium-wavelength infrared image sensor 7, and a long-wavelength infrared image sensor 9; a signal processing part 20 for receiving and processing data of the input part 10; a display part 30 for receiving and displaying data of the signal processing part 20; a storage part 40 for storing data of the signal processing part 20 and the display part 30; and a control part 90 provided with a camera control board 50 and a drive control board 60 for controlling the input part 10, the signal processing part 20, the display part 30 and the storage part 40.

Referring to FIG. 5, the input part 10 of a multiple-wavelength image analysis electro-optical system 1 for detecting a disabled ship and persons overboard of the present invention is provided with an ultra-low light camera 3, a short-wavelength infrared image sensor 5, a medium-wavelength infrared image sensor 7, and a long-wavelength infrared image sensor 9.

Referring to FIG. 5 to FIG. 8, a multiple-wavelength image analysis electro-optical system 1 for detecting a disabled ship and persons overboard of the present invention is a multiple-wavelength image analysis electro-optical system for detecting a disabled ship and persons overboard configured to have an input part 10 provided with an ultra-low light camera 3, a short-wavelength infrared image sensor 5, a medium-wavelength infrared image sensor 7, and a long-wavelength infrared image sensor 9; a signal processing part 20 for receiving and processing data of the input part 10; a display part 30 for receiving and displaying data of the signal processing part 20; a storage part 40 for storing data of the signal processing part 20 and the display part 30; and a control part 90 provided with a camera control board 50 and a drive control board 60 for controlling the input part 10, signal processing part 20, the display part 30 and the storage part 40.

The input part 10 is provided with an image receiving part 100, and the image receiving part 100 includes a visible light image receiving module 110, an infrared image receiving module 120, and an image conformity checking module 130.

The signal processing part 20 is provided with an image analyzing part 200, and the image analyzing part 200 includes a visible light image processing module 210, a multiple-wavelength mixture analysis module 220, and a process result integration module 230.

The display part 30 is provided with an image visualization part 300, and the image visualization part 300 includes a multiple-wavelength image visualization module 310, an infrared image visualization module 320, and an integrated image visualization module 330.

The camera control board 50 includes an EMCCD module 51, a VIS filter control module 52, an EMCCD zoom lens module 53, and includes an LWIR module 55, MWIR module 56, and an SWIR module 57.

The drive control board 60 includes a fan-motor driver 61 and a fan-motor encoder 63, and the drive control board 60 includes a tilt-motor driver 65 and a tilt-motor encoder 67.

The camera control board 50 and the drive control board 60 receive a control signal from a signal processing board 70.

The signal processing board 70 receives a control signal from a user UI 80.

Referring to FIG. 8, the multiple-wavelength image analysis electro-optical system 1 for detecting a disabled ship and persons overboard of the present invention includes an image receiving part 100, an image analyzing part 200 and an image visualization part 300.

The image receiving part 100 includes visible light image receiving module 110, an infrared image receiving module 120, and an image conformity checking module 130, and the image analyzing part 200 includes a visible light image processing module 210, an infrared image processing module 220, and a process result integration module 230, and the image visualization part 300 includes a visible light image visualization module 310, an infrared image visualization module 320, and an integrated image visualization module 330.

Referring to FIG. 9, a schematic operation of the multiple-wavelength image analysis electro-optical system for detecting a disabled ship and persons overboard according to the present invention is described as follows.

The image receiving part 100 receives a visible light band and infrared band of an observed aeronautical multiple-wavelength signal and checks whether it is suitable for detection analysis in step S100.

The visible light image receiving module 110 receives an observed aeronautical visible light image in step S110.

The infrared image receiving module 120 receives an observed aeronautical infrared image in step S120.

The image conformity checking module receives the received aeronautical visible light image and aeronautical infrared image to check whether the observation information and image observation value are suitable for detection analysis in step S130.

The image analyzing part 200 signal processes the received aeronautical visual light image and infrared image and generates an original image for each wavelength and signal process in step S200.

The visible light image processing module 210 signal processes the received aeronautical visible light image in step S210.

The infrared image processing module 220 signal processes the received aeronautical infrared image in step S220.

The process result integration module 230 integrates the images signal processed in the visible light image processing module 210 and the infrared image processing module 220 in step S230.

A marine object detection algorithm for morphological feature-based detection and optimal threshold-based detection based on a multiple-wavelength image is applied in step S300.

A marine object detection algorithm for morphological feature-based detection based on a multiple-wavelength image is applied in step S310.

A marine object detection algorithm for optimal threshold-based detection based on a multiple-wavelength image is applied in step S320.

The image visualization part 300 visualizes and stores the received visible light image and infrared image in an image form and displays the location of the detected disabled vessel and persons overboard and detailed information of detection results in step S400.

The visible light image visualization module 310 visualizes the aeronautical visible light image in an image form to display and store in step S410.

The infrared image visualization module 320 visualizes the aeronautical infrared image in an image form to display and store in step S420.

The integrated image visualization module 330 distinguishes the detected disabled vessel and overboard persons to visualize detected bodies in an integrated image form to display and store in step S430.

Referring to FIG. 1 to FIG. 10, the operation of the multiple-wavelength image analysis electro-optical system for detecting a disabled ship and persons overboard according to the present invention is described in detail as follows.

Referring to FIG. 1, in order to improve the probability of detection of disabled vessels and missing persons in various marine environments, the present invention obtains a multiple-wavelength image of three wavelengths in the visible light area and two wavelengths in the infrared area to realize an electro-optical system capable of multiple-wavelength image analysis, and through image analysis of each wavelength, search targets are detected.

Referring to FIG. 2, as a detection condition, fog, fine dust, rain and such of daytime and nighttime conditions are included, and detection targets include marine drift vessels and missing persons in the sea.

Three wavelengths in the visible light area and two wavelengths in the near infrared area, which are the optimal wavelength bands of the multiple-wavelength detection sensor, are derived in consideration of the search target and the search environment conditions. That is, in a marine environment having a particle diameter of 1 µm or less, such as fog, fine dust, smoke, etc., the wavelength of visible light is smaller than the particle size, so that light is scattered and does not reach visible visual equipment or the naked eye.

Referring to FIG. 3, in the present invention, a short-wave infrared sensor for a wavelength of 1 to 2.5 µm, which is longer than particles of fog, fine dust, smoke and etc., is used. Further, when in a low light environment, a long-wave infrared (LWIR) sensor for a wavelength of 8 to 14 µm, which is longer than the short-wave infrared (SWIR) sensor is used.

Referring to FIG. 4, in order to derive requirements for a multiple-wave sensor for each platform for searching (vessel, airplane and such) and to analyze applicability of the same, the search target condition in a search area of the sea is set according to the size (small, medium, large) of the vessel and the submerged state of the missing person (state 1, state 2, state 3).

Referring to FIG. 5 to FIG. 8, system requirements for optimal image acquisition according to search environment conditions are derived. In other words, the application of the electro-optical sensor to search for marine accidents are analyzed, the cases of detection of the electro-optical sensors by the search environmental conditions (low light, sea, rain, nighttime) are analyzed, and the wavelength range of three wavelengths of a visible light band electro-optical sensor and a spectroscopic method are derived, and the optimum wavelength of the two wavelengths of the infrared band electro-optical sensor is selected.

In addition, the wavelength range specification of the visible light band electro-optical sensor of the multiple-wavelength analysis system and spectral filter specifications for spectroscopic image spectroscopy with three wavelengths are selected and images are acquired to design an exhibition module. Also, a first prototype mechanical part of an integrated electron-optical sensor (visible light+spectral filter, infrared sensor) of the multiple-wavelength image analysis system is modeled and an image is acquired to design the exhibition module in detail. At this time, basic design of detection and analysis algorithm for each wavelength band image, individual image analysis for each wavelength band, and search target detection algorithm are used.

Referring to FIG. 9, the image receiving part 100 receives a visible light band and infrared band of an observed aeronautical multiple-wavelength signal and checks whether it is suitable for detection analysis in step S100.

The visible light image receiving module 110 receives an observed aeronautical visible light image in step S110.

The infrared image receiving module 120 receives an observed aeronautical infrared image in step S120.

The image conformity checking module receives the received aeronautical visible light image and aeronautical infrared image to check whether the observation information and image observation value are suitable for detection analysis in step S130.

The image analyzing part 200 signal processes the received aeronautical visual light image and infrared image and generates an original image for each wavelength and signal process in step S200.

The visible light image processing module 210 signal processes the received aeronautical visible light image in step S210.

The infrared image processing module 220 signal processes the received aeronautical infrared image in step S220.

The process result integration module 230 integrates the images signal processed in the visible light image processing module 210 and the infrared image processing module 220 in step S230.

A marine object detection algorithm for morphological feature-based detection and optimal threshold-based detection based on a multiple-wavelength image is applied in step S300.

A marine object detection algorithm for morphological feature-based detection based on a multiple-wavelength image is applied in step S310.

A marine object detection algorithm for optimal threshold-based detection based on a multiple-wavelength image is applied in step S320.

The image visualization part 300 visualizes and stores the received visible light image and infrared image in an image form and displays the location of the detected disabled vessel and persons overboard and detailed information of detection results in step S400.

The visible light image visualization module 310 visualizes the aeronautical visible light image in an image form to display and store in step S410.

The infrared image visualization module 320 visualizes the aeronautical infrared image in an image form to display and store in step S420.

The integrated image visualization module 330 distinguishes the detected disabled vessel and overboard persons to visualize detected bodies in an integrated image form to display and store in step S430.

Referring to FIG. 10, in the present invention, a marine object detection algorithm for morphological feature-based detection and optimal threshold-based detection based on a multiple-wavelength image is applied in step S300. Unlike the conventional multiple-wavelength image-based marine target detection technology in which detection range is largely limited depending on spatial resolution and target size when multiple substances in a pixel are mixed by using simple reflectance or morphological characteristics, this differs as follows.

In an embodiment of the present invention, a marine object detection algorithm for morphological feature-based detection based on a multiple-wavelength image expresses what is observed from each pixel into a feature vector for image segmentation and assumes an appropriate probability model relative thereto and uses methods wherein segmentation is performed by using parameters estimated by a statistical method for determining the probability model, or using a cluster algorithm based on a degree of similarity between each feature vector. For example, the marine object detection algorithm is an application field of problems of calculating a maximum likelihood for an unknown parameter in an incomplete data in one case or finding a maximum value of a posterior probability distribution and since the performance of the estimator depends on a starting point, the likelihood function converges to the local maximum value in step S310.

In an embodiment of the present invention, the marine object detection algorithm for optimal threshold-based detection based on the multiple-wavelength image uses an optimized image segmentation technique for setting a threshold through a new histogram of an image by mixing a Gaussian formula formed around all level values of the image with an original histogram of the image. In this algorithm, when the image is divided variously according to the number of threshold values, an edge portion is clearly shown and can be divided into detailed and accurate images to detect the marine object in step S320.

By applying the morphological feature-based detection and an optimal threshold-based detection algorithm based on the multiple-wavelength image of the present invention, the result detected by the image receiving unit 100 is transmitted to a user via the image visualization unit 300 and is finally displayed in a user-friendly graphical user interface (GUI) form in step S400.

The image visualization unit 300 selects a specific band (e.g. RGB) to display and store an inputted aeronautical visible light image in an image form in a visible light image visualization module 310 in step S410, and displays and stores an aeronautical infrared image in an image form in an infrared image visualization module 320 in step S420.

The integrated image visualization module 330 distinguishes the detected disabled vessel and persons overboard to visualize a location of a detected body in an integrated image form and displays and stores the same, and divides the detection result according to classification to display and store in a tabular form together with detailed information such as type (vessel, persons overboard), size, latitude and longitude and the like. Further, an aeronautical observation multiple-wavelength image that undergone a preprocessing process in the image receiving part 100 and a detected body detected within a corresponding area in an image form is displayed in real-time together with detailed information displayed in text form in step S430.

In a test according to one embodiment of the multiple-wavelength image analysis electro-optical system for detecting a disabled ship and persons overboard and an analysis method thereof, of the present invention, as a result of evaluating the performance of the conventional search image equipment (daytime image camera) in each marine environmental condition (fog, fine dust, rain), it was confirmed that the peak signal-to-noise ratio (PSNR) of the image was improved by 10%. In addition, it was possible to confirm that the target detection performance of detecting search targets had an accuracy level of 90% or over for the probability of detection (POD), and less than 10% for the false alarm ratio (FAR).

The multiple-wavelength image analysis electro-optical system and its analysis method for detecting a disabled vessel and persons overboard of the present invention overcome the marine target detection limit of conventional technology by applying a multiple-wavelength mixed analysis method for each pixel using multiple-wavelength information, and provides more accurate and stable detection results immediately without further operations.

In addition, a multiple-wavelength image is used for improving identification ability that is optimized based on various subjects to be searched, and improves the degree of distinction through reflected light spectral analysis test results of each target and can support rapid search operations of disabled ships and persons overboard caused by marine accidents. Through this, it is possible to reduce the detection time of accident ship and missing person due to marine accidents, increase the detection probability, and support quick search operation.

In addition, probability of detection can be improved to 90% or more and false alarm rates less than 10% can be achieved by applying a multiple-wavelength image detection algorithm specific to a search subject. Further, the present invention utilized as a core technology in the field of surveillance of military defense and illegal fishing vessels, which is rapidly increasing in demand in recent years, enables establishing a base for localization and advancement of the whole marine search equipment industry which is in constant demand.

In addition, since the multiple-wavelength electro-optical detection equipment developed exclusively by some companies of major advanced countries currently has a limit in supplying for various uses and applications due to expensive equipment cost, according to the present invention, the cost of equipment that relied on foreign markets could be reduced significantly, and can have a large ripple effect on industry in the development of surveillance and reconnaissance equipment that has been stagnated due to technical barriers.

Further, it is not only necessary for public organizations such as the Ministry of Maritime Affairs and Fisheries, Maritime Security Headquarters, and the Navy, which are capable of detecting various marine environmental conditions and the size, type, and condition of search targets, and has marine accident search and rescue missions as a duty, it can also be applied to defense surveillance reconnaissance, and monitoring of illegal fishing vessels that have recently become a social issue.

Although a specific embodiment of the present invention has been described so far, the description of various embodiments described in the "Best Mode for carrying out the Invention" is merely illustrative, and it is apparent that various modifications can be made without departing from the scope of the present invention.

In addition, since the present invention can be embodied in various other forms, the present invention is not limited by the above description, and the above description is intended to provide a thorough understanding of the present invention. It will be understood by those of ordinary skill in the art that the present invention is only provided to fully inform the person skilled in the art of the scope of the present invention and the present disclosure will only be defined by the appended claims.

The invention claimed is:

1. A multiple-wavelength image analysis electro-optical system for detecting a disabled vessel and persons overboard comprising:
    an input part provided with an ultra-low light camera, a short-wavelength infrared image sensor, a medium-wavelength infrared image sensor, and a long-wavelength infrared image sensor;
    a signal processing part for receiving and processing data of the input part;
    a display part for receiving and displaying data of the signal processing part;
    a storage part for storing data of the signal processing part and the display part; and a control part including a camera control board and a drive control board for controlling the input part, the signal processing part, the display part and the storage part, wherein the input part is provided with an image receiving part configured to receive a visible light band and infrared band of an observed aeronautical multiple-wavelength signal and further configured to check whether a criterium is satisfied for detection analysis, wherein the image receiving part further comprises a visible light image receiving module configured to receive an observed aeronautical visible light image, an infrared image receiving module configured to receive an observed aeronautical infrared image, and an image conformity checking module configured to receive the observed aeronautical visible light image and infrared image for checking whether observation information and image observation value satisfy a criterium for detection analysis, wherein the signal processing part includes an image analyzing part configured to process the observed aeronautical visible light image and infrared image and further configured to generate an original image for each wavelength and signal process, wherein the image analyzing part includes a visible light image processing module configured to process the observed aeronautical visible light image, an infrared image processing module configured to process the observed aeronautical infrared image, and a process result integration module configured to integrate the observed aeronautical visible light and infrared images that are signal processed in the visible light image processing module and the infrared image processing module, wherein the display part includes an image visualization part configured to visualize and store the observed aeronautical visible light image and infrared image in an image form and further configured to display location of the detected disabled vessel and persons overboard and information of detection results, wherein the image visualization part includes a visible light image visualization module configured to visualize the observed aeronautical visible light image in an image form for display and storage, an infrared image visualization module configured to visualize the observed aeronautical infrared image in an image form for display and storage, and an integrated image visualization module configured to distinguish the detected disabled vessel and overboard persons to visualize detected bodies in an integrated image form for display and storage.

2. The system of claim 1, wherein the camera control board 50 includes an EMCCD module, a VIS filter control module, and an EMCCD zoom lens module.

3. The system of claim 2, wherein the camera control board includes an LWIR module, MWIR module, and an SWIR module.

4. The system of claim 1, wherein the drive control board includes a fan-motor driver and a fan-motor encoder.

5. The system of claim 4, wherein and the drive control board includes a tilt-motor driver and a tilt-motor encoder.

6. The system of claim 1, wherein the camera control board and the drive control board receive a control signal from a signal processing board.

7. The system of claim 6, wherein the signal processing board receives a control signal from a user UI.

\* \* \* \* \*